UNITED STATES PATENT OFFICE.

CHRISTIAN M. EDWARD SCHROEDER, OF RUTHERFORD, NEW JERSEY, ASSIGNOR TO THE TITANIUM ALLOY MANUFACTURING COMPANY, OF NEW YORK, N. Y., A CORPORATION OF MAINE.

METHOD OF TREATING MATERIALS WITH SOLUTIONS OF TITANOUS SALTS.

1,080,721.  Specification of Letters Patent.  Patented Dec. 9, 1913.

No Drawing.  Application filed January 23, 1913. Serial No. 743,724.

*To all whom it may concern:*

Be it known that I, CHRISTIAN M. EDWARD SCHROEDER, a citizen of the United States, and a resident of Rutherford, in the county of Bergen and State of New Jersey, have invented certain new and useful Improvements in Methods of Treating Materials with Solutions of Titanous Salts, of which the following is a specification.

My present invention relates to the bleaching of materials, comprising textile fabrics, thus including the discharging, or restoring, of certain coloring matters such as dyes, and other organic substances whether of natural or artificial production.

The objects of my invention comprise provision of methods for so treating the materials, which are more simple, economical, rapid, certain, and less injurious than heretofore. I attain these objects by my novel methods hereinafter described.

Prior to my invention the reducing action of acid-derived solutions containing titanous compounds has been known in bleaching aforesaid, likewise the advantage of iron, to produce ferrous chlorid, in such solutions, and, to this end, resort had to solution of the alloy of iron and titanium in hydrochloric acid, but my researches and tests have demonstrated that while such last mentioned solution is, to an extent, useful, it, as well as the other previous methods, involving use of preliminarily prepared unit solutions, have proved to a greater, or less, extent deficient because of their more, or less, rapid deterioration, involving corresponding exhaustion of their activity due to their contact with the materials treated, to their oxidation from exposure to the air, or to both these, as well as other causes.

It will be understood that the present approved method of manipulating the materials, say for example bolts of fabric, is, as by unreeling and re-reeling them, to cause the fabric to pass continuously through the previously prepared unit of solution the constituents of which have been calculated and assembled in proportions inferred to be suitable for the work in hand.

For entire treatment of an estimated quantity of the latter, such charge, or unit, has been hitherto usually relied on, it being prepared in advance by a necessarily skilful operator, and modifications thereof, during the passage therethrough of the piece of fabric, as by additions of alkali to temper destructive acidity, being deprecated, if not prohibited, as injurious or undesirable makeshifts in aid of faulty original composition. As compared with my present methods, this hitherto practised procedure not only requires greater skill, technical knowledge, and experience on the part of the operator, but also comparatively greater expenditure of ingredients, owing to the deteriorations referred to, and results usually, in much less perfect and uniform final products. I have discovered that the activity, *i. e.* the bleaching, discharging, or restoring functions of the titanous chlorid in solution are most intense, uniform and perfect in its nascent state, and decrease thereafter according to the time since elapsed; likewise that constant liberation of nascent hydrogen in the solution greatly safeguards it against undesirable, or prohibitory oxidation. The value of these nascent conditions of the agents employed have not, I believe, been hitherto appreciated or utilized in this art, and hence the substantial, if not prohibitory, difficulties and detriments hitherto, I believe, attending employment industrially of titanous salt solutions for the purposes referred to.

My novel method discards the hitherto preliminary preparation of the solution as a unit, and on the contrary so assembles and manipulates the agents employed as to constantly and uniformly bring into the presence of the materials treated, during their passage through the solution, nascent titanous chlorid, and into the solution at all times sufficient nascent hydrogen to prevent undesirable oxidation.

A novel feature of my method is to have in the bath comprising my solution, during treatment of the materials, a supply of metallic titanium; another novel feature is to add to said bath during passage of the fabrics therethrough an acid solvent of titanium, preferably hydrochloric acid. I prefer also to have in said bath during treatment of the materials a supply of metallic iron. I am not aware, and do not believe that prior to my invention any materials have thus been subjected to action of a bath containing metallic titanium, or metallic titanium and metallic iron, or that to any such bath has been added during such treatment an acid solvent of titanium.

I practise my said novel method as follows:—Into a tub, vat, or any suitable vessel I charge titanium, or, preferably, also iron, as for example most conveniently, and economically, in the form of an alloy of iron and titanium, now obtainable in the market and containing titanium about 25%, though I would prefer higher percentages of titanium say up to 60%. These ingredients of the charge I prefer to crush to moderate fineness say about No. 1 mesh. The quantity will depend of course on circumstances, care being taken that it be sufficient to insure throughout the contemplated treatment presence of metallic titanium, or of metallic titanium and iron in the bath. For example in one instance I charged into the vat 100 lbs. of the said alloy, 25% titanium. Upon this I poured enough of a mixture of hydrochloric acid and water, equal parts, to submerge the alloy. When action was well under way I added enough water to conveniently fill the vat to a volume suitable for passage therethrough of pieces of textile fabrics in the manner above described. Before entering the fabrics into the bath I adjusted, as should be, its acid strength to a point suitable for the work in hand. This I did by taking the specific gravity of the liquor while adding thereto water until the proper point say 1° Tw. was reached. I then started the fabrics' passage through the bath whence they passed through the usual washing apparatus to remove therefrom the acid and salts. By their passage through the bath the fabrics treated not only removed therefrom said acids and salts, but also substantial volumes of the bath. These deductions from the bath I compensated for by adding to the latter, during passage of the fabrics therethrough, a mixture of hydrochloric acid and water of the same strength and character as that originally prepared as aforesaid. This was allowed to flow into the vat substantially continuously and in quantity sufficient to make up the aforesaid loss of the liquor, i. e. the level of the bath was maintained substantially constant during treatment therein as aforesaid of the entire piece, or pieces, of fabric operated on. The results of my method thus comprise continuous formation of nascent titanous chlorid and hydrogen in presence of the fabrics during the entire passage of the latter through the bath, said hydrogen being, as will be understood, due to the continuous dissolving of the metals thus, for the first time I believe, constantly contained in the bath.

As compared with the hitherto, I believe universal, practice of employing preliminarily prepared unit solutions which are decanted and allowed to stand as such indefinitely prior to and during use, the ease, economy, uninjuriousness, and certainty with which my method can be practised is notable; also the fact that comparatively unskilled labor can be relied on to thereby sufficiently and properly initially charge the vat with metal, to proportion the initial mixture of hydrochloric acid and water half and half, to ascertain the required Twaddell, and thereafter to supply the substantially continuous regulated inflow of similar acid solution until the operation is completed. But even more important is the resulting economy, effectiveness and harmlessness of thus using on the fabrics the continuously nascent titanous chlorid substantially as fast as it is produced, instead of, as heretofore, trusting thereto after its inevitable impairment in activity and efficiency through attacks thereon by other chemical agents present; also the advantage of thus keeping the bath, from inception to finish of the operation, at its initial efficiency relatively to the coloring matters to be bleached, discharged, or restored in the fabrics. It will also be noted that by means of my method a special advantage is secured when dealing with materials of animal origin such as silks and wools, and this particularly in instances in which iron is not supplied to the bath, i. e. the consumption of the titanous chlorid, substantially as fast as produced, by its chemical combination with constituents of the coloring matters abridges opportunity for its useless decomposition in the bath to produce titanic acid, and the free chlorin injurious to animal substances.

The titanous chlorid acts, in its nascent state, more powerfully as a reducing agent upon certain coloring matters, whether natural or artificial. It thus deoxidizes as required to improve the appearance of the fabric wherever it has been undesirably affected by oxidizing agents; as for example, in discharging, it thus operates to remove the color from previously artificially applied dyes; while in restoring, it operates similarly in restoring original color to portions of the fabric which, by reason of previous finishing or bleaching treatments, have been unduly oxidized and consequently dimmed or altered.

It will be understood that I do not confine myself to hydrochloric acid for the purpose mentioned; sulfuric, or any other suitable acid, capable, under the conditions mentioned, of dissolving titanium, and also of dissolving iron if the latter be employed, may be substituted, in whole or in part, for the hydrochloric acid.

What I claim as new and desire to secure by Letters Patent is the following, viz:—

1. The method of bleaching materials which comprises immersing them in a bath containing metallic titanium and an acid solvent of titanium.

2. The method of bleaching materials which comprises immersing them in a bath containing metallic titanium and hydrochloric acid.

3. The method of bleaching materials which comprises immersing them in a bath containing metallic titanium, metallic iron and an acid solvent of titanium and of iron.

4. The method of bleaching materials which comprises immersing them in a bath containing metallic titanium, metallic iron and hydrochloric acid.

5. The method of bleaching materials which comprises immersing them in a bath containing an alloy of iron and titanium and an acid solvent thereof.

6. The method of bleaching materials which comprises immersing them in a bath containing an alloy of iron and titanium and hydrochloric acid.

7. The method of bleaching materials which comprises passing them through a bath containing metallic titanium and during such passage adding to said bath an acid solvent of titanium.

8. The method of bleaching materials which comprises passing them through a bath containing metallic titanium and during such passage adding to said bath hydrochloric acid.

9. The method of bleaching materials which comprises passing them through a bath containing metallic titanium and metallic iron and during such passage adding to said bath an acid solvent of titanium and of iron.

10. The method of bleaching materials which comprises passing them through a bath containing metallic titanium and metallic iron and during such passage adding to said bath hydrochloric acid.

11. The method of bleaching materials which comprises passing them through a bath containing an alloy of iron and titanium and during such passage adding to said bath an acid solvent of titanium and of iron.

12. The method of bleaching materials which comprises passing them through a bath containing an alloy of iron and titanium and during such passage adding to said bath hydrochloric acid.

CHRISTIAN M. EDWARD SCHROEDER.

Witnesses:
　WALTER D. EDMONDS,
　PHILIP C. PECK.